United States Patent
Georgin

(10) Patent No.: US 11,970,151 B2
(45) Date of Patent: Apr. 30, 2024

(54) SYSTEMS AND METHODS FOR AIRCRAFT ANTISKID BRAKING

(71) Applicant: GOODRICH CORPORATION, Charlotte, NC (US)

(72) Inventor: Marc Georgin, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 601 days.

(21) Appl. No.: 16/812,078

(22) Filed: Mar. 6, 2020

(65) Prior Publication Data

US 2021/0276519 A1    Sep. 9, 2021

(51) Int. Cl.
 *B60T 8/32*    (2006.01)
 *B60T 8/17*    (2006.01)
 *B60T 8/171*   (2006.01)
 *B60T 8/172*   (2006.01)
 *B60T 8/176*   (2006.01)
 (Continued)

(52) U.S. Cl.
 CPC ............ *B60T 8/325* (2013.01); *B60T 8/1703* (2013.01); *B60T 8/171* (2013.01); *B60T 8/172* (2013.01); *B60T 8/176* (2013.01); *B60T 8/18* (2013.01); *B60T 8/58* (2013.01); *B64C 25/44* (2013.01);
 (Continued)

(58) Field of Classification Search
 CPC ........ B60T 8/1703; B60T 8/171; B60T 8/172; B60T 8/17616; B60T 8/325; B60T 8/58; B60T 2210/13; B60T 13/662; B60T 8/176; B60T 8/18; B60T 2240/00; B60T 2250/02; B60T 2270/10; G05B 19/416; B64C 25/44
 See application file for complete search history.

(56) References Cited

U.S. PATENT DOCUMENTS 6,125,318 A    9/2000  Zierolf
9,663,223 B1   5/2017  Harrison et al.
(Continued)

FOREIGN PATENT DOCUMENTS

CN    104401305    1/2017
CN    106628129    10/2018
(Continued)

OTHER PUBLICATIONS

European Patent Office, European Search Report dated Oct. 28, 2021 in Application No. 21161369.0.
(Continued)

*Primary Examiner* — Faris S Almatrahi
*Assistant Examiner* — Andrew J Cromer
(74) *Attorney, Agent, or Firm* — Snell & Wilmer L.L.P.

(57) ABSTRACT

Systems and methods for antiskid brake control include a brake control unit (BCU) configured to generate a brake command signal adjusted for a wide range of brake coefficient of friction based upon a real-time aircraft kinetic energy value. A method for antiskid brake control includes receiving, by a BCU, an aircraft mass and a wheel speed signal. The BCU determines an aircraft speed based upon the wheel speed signal and calculates the aircraft kinetic energy using the aircraft speed and aircraft mass. One or more antiskid parameters (e.g., proportional gain, a derivative gain, and/or deceleration target value) are adjusted based upon the aircraft kinetic energy to generate, by the brake control unit, an optimal antiskid brake command signal.

20 Claims, 5 Drawing Sheets

(51) Int. Cl.
  *B60T 8/18* (2006.01)
  *B60T 8/58* (2006.01)
  *B64C 25/44* (2006.01)

(52) U.S. Cl.
  CPC ....... *B60T 2240/00* (2013.01); *B60T 2250/02* (2013.01); *B60T 2270/10* (2013.01)

(56) References Cited

U.S. PATENT DOCUMENTS

| | | | |
|---|---|---|---|
| 10,081,346 B2 | 9/2018 | Romana et al. | |
| 2007/0132311 A1* | 6/2007 | Giazotto | B60T 8/1703 303/126 |
| 2008/0221768 A1* | 9/2008 | Salamat | B60T 8/325 303/166 |
| 2015/0012153 A1* | 1/2015 | Metzger, Jr. | B60T 8/172 702/43 |
| 2015/0142217 A1 | 5/2015 | Metzger, Jr. | |
| 2017/0174201 A1 | 6/2017 | Georgin et al. | |
| 2018/0201367 A1* | 7/2018 | Georgin | B64C 25/46 |

FOREIGN PATENT DOCUMENTS

| | | |
|---|---|---|
| CN | 110341944 | 10/2019 |
| EP | 2821302 | 1/2015 |
| EP | 3348474 | 7/2018 |
| EP | 3556619 | 10/2019 |

OTHER PUBLICATIONS

European Patent Office, European Partial Search Report dated Jul. 28, 2021 in Application No. 21161369.0.

European Patent Office, European Search Report dated May 11, 2023 in Application No. 23154500.5.

\* cited by examiner

SYSTEMS AND METHODS FOR AIRCRAFT ANTISKID BRAKING

FIELD

In general, the arrangements disclosed herein relate to braking systems and methods. More specifically, they relate to systems and methods for antiskid brake control suitable for use in aircraft.

BACKGROUND

Aircraft typically include a braking system operatively coupled to the wheels of the aircraft and configured to slow the wheels, and the aircraft, during, for example, landing or a rejected takeoff. Aircraft braking systems tend to utilize aircraft brake controllers, to control various aspects of the braking system. In this regard, as a pilot applies force to the brake pedals, the pressure or force applied at the brake is increased to decelerate the wheel and aircraft. As the pressure/force exceeds the braking condition supported by the tire/runway friction, antiskid control may become dominant to adjust brake pressure/braking force to prevent or reduce skidding.

SUMMARY

A method for antiskid brake control is disclosed, comprising receiving, by a brake control unit, an aircraft mass, receiving, by the brake control unit, a wheel speed signal, determining, by the brake control unit, an aircraft speed based upon the wheel speed signal, adjusting, by the brake control unit, an antiskid parameter based upon the aircraft mass and the aircraft speed, generating, by the brake control unit, an antiskid brake command signal based upon the adjusted antiskid parameter, and sending, by the brake control unit, the antiskid brake command signal to a brake control component to apply a stopping force to a wheel assembly.

In various embodiments, the antiskid parameter is a deceleration target value.

In various embodiments, the brake control unit generates the antiskid brake command signal using a PID controller.

In various embodiments, the antiskid parameter is a proportional gain value.

In various embodiments, the antiskid parameter is a derivative gain value.

In various embodiments, the method further comprises calculating, by the brake control unit, an aircraft kinetic energy using the aircraft mass and the aircraft speed, wherein the antiskid parameter is adjusted based upon the aircraft kinetic energy.

In various embodiments, the aircraft kinetic energy is calculated using an equation $$KE = \frac{1}{2} mV^2,$$

where KE is the aircraft kinetic energy, m is the aircraft mass, and V is the aircraft speed.

In various embodiments, the deceleration target value comprises a maximum desired deceleration of a wheel.

In various embodiments, the aircraft mass is received by the BCU from an aircraft avionics unit and the wheel speed signal is received by the BCU from a wheel speed sensor associated with the wheel assembly.

An antiskid brake control system is disclosed, comprising a brake control unit (BCU) having a processor, and a tangible, non-transitory memory configured to communicate with the processor. The tangible, non-transitory memory has instructions stored thereon that, in response to execution by the processor, cause the BCU to perform operations comprising receiving, by the BCU, an aircraft mass, receiving, by the BCU, a wheel speed signal, determining, by the BCU, an aircraft speed based upon the wheel speed signal, adjusting, by the BCU, an antiskid parameter based upon the aircraft mass and the aircraft speed, generating, by the BCU, an antiskid brake command signal based upon the adjusted antiskid parameter, and sending, by the BCU, the antiskid brake command signal to a brake control component for applying a stopping force to a wheel assembly.

In various embodiments, the aircraft mass is received by the BCU from an aircraft avionics unit.

In various embodiments, the wheel speed signal is received by the BCU from a wheel speed sensor associated with the wheel assembly.

In various embodiments, the instructions cause the BCU to perform further operations comprising calculating, by the BCU, an aircraft kinetic energy using the aircraft mass and the aircraft speed, wherein the antiskid parameter is adjusted based upon the aircraft kinetic energy.

In various embodiments, the antiskid parameter is a deceleration target value.

In various embodiments, the BCU generates the antiskid brake command signal using a PID controller.

In various embodiments, the antiskid parameter is a proportional gain value.

In various embodiments, the antiskid parameter is a derivative gain value.

An antiskid brake control system is disclosed, comprising a brake control unit (BCU), a wheel/brake assembly comprising a wheel, a brake stack, and an actuator configured to apply a braking force onto the brake stack, and a wheel speed sensor in electronic communication with the BCU, the wheel speed sensor configured to detect a wheel speed corresponding to the wheel. The BCU is configured to receive an aircraft mass from an avionics unit, calculate an aircraft kinetic energy, generate an antiskid brake command signal based upon the aircraft kinetic energy, and send the antiskid brake command signal to a brake control component for controlling the braking force.

In various embodiments, the BCU is further configured to calculate an aircraft speed based upon the wheel speed, the BCU calculates the aircraft kinetic energy using the aircraft speed and the aircraft mass.

In various embodiments, the BCU is further configured to adjust an antiskid parameter based upon the aircraft kinetic energy, the antiskid parameter comprises at least one of a proportional gain value, a derivative gain value, and a deceleration target value, and the antiskid brake command signal is generated using the adjusted antiskid parameter.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

Figure 1:
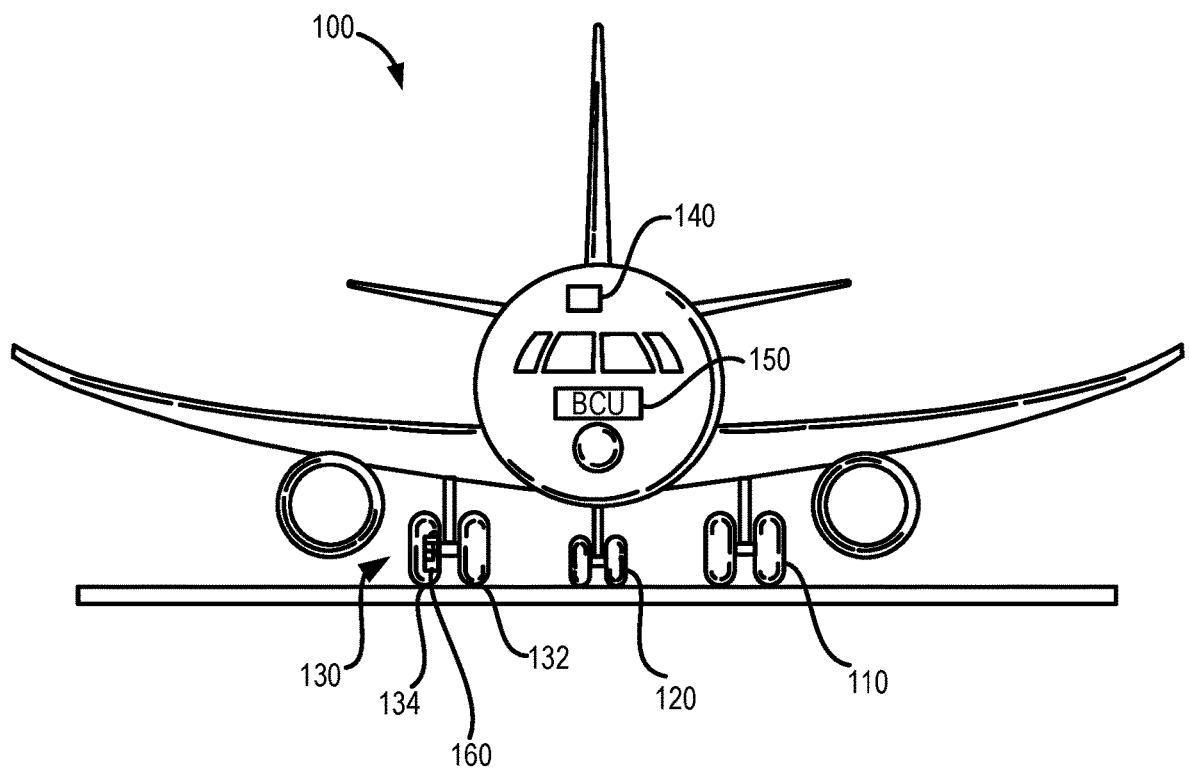
FIG. 1 illustrates an aircraft having multiple landing gear and brakes, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

As used herein, the term "weight-on-wheels (WOW) condition" means that at least a portion of the aircraft is supported on the ground via the landing gear with the associated tire in contact with a ground surface.

Provided herein, according to various embodiments, are systems, methods, and devices for brake control, such as within a braking system of an aircraft. While numerous details are included herein pertaining to aircraft components, such as brake components, the systems and methods disclosed herein can be applied to other systems with antiskid brake control and the like.

A brake control system of the present disclosure includes a brake control unit (BCU) configured to generate a brake command signal that is optimal over a wide range of aircraft landing energies. The BCU calculates an aircraft kinetic energy based upon a wheel speed signal and an aircraft mass received by the BCU. The BCU then adjusts one or more antiskid parameters to optimize the brake command signal for the real-time, calculated aircraft energy.

In various embodiments, the disclosed systems and methods may be particularly useful for aircraft braking as the aircraft reaches slower speeds—e.g., 40 knots and slower—when it may be more difficult to control wheel speed deceleration. For example, brake coefficient of friction ($\mu$) values may be higher for braking maneuvers of lower aircraft energy, which means that as the aircraft slows down, it may become more difficult to control the wheel speed deceleration due to the higher brake coefficient of friction ($\mu$). Everything else being equal, a small change in pressure command creates a higher change in brake torque, which may tend to cause the wheel to skid or lock up faster.

The disclosed methods may adjust an "aggressiveness" of antiskid braking tuning to improve antiskid activity, particularly at lower aircraft speeds. The disclosed methods may be based on initial landing/rejected take-off ("RTO") energy conditions. The disclosed methods may reduce deep skid activity during a braking maneuver and improve comfort while reducing tire wear. At higher energy stops, the disclosed methods also allow the antiskid tuning to be more aggressive and therefore improve overall braking efficiency performance when there is elevated energy to dissipate, without compromising the braking response at lower energy braking.

Referring now to FIG. 1, an aircraft 100 includes multiple landing gear systems, including a first landing gear 110, second landing gear 120, and third landing gear 130. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and oftentimes, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a BCU 150. The BCU 150 includes one or more controllers (e.g., processors) and one or more tangible, non-transitory memories capable of implementing digital or programmatic logic. In various embodiments, for example, the one or more controllers are one or more of a general purpose processor, DSP, ASIC, FPGA, or other programmable logic device, discrete gate, transistor logic, or discrete hardware components, or any various combinations thereof or the like, and the one or more memories store instructions that are implemented by the one or more controllers for performing various functions, such as antiskid brake control, as will be discussed herein. In various embodiments, the BCU 150 controls, at least various parts of, the braking of the aircraft 100. For example, the BCU 150 controls various parameters of braking, such as manual brake control, automatic brake control, antiskid control, locked wheel protection, touchdown protection, park capability, gear retraction braking, and the like. The BCU 150 may further include hardware capable of performing various logic using discreet power signals received from various aircraft systems.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Referring again more particularly to FIG. 1, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 comprises any number of wheels.

Figure 2:
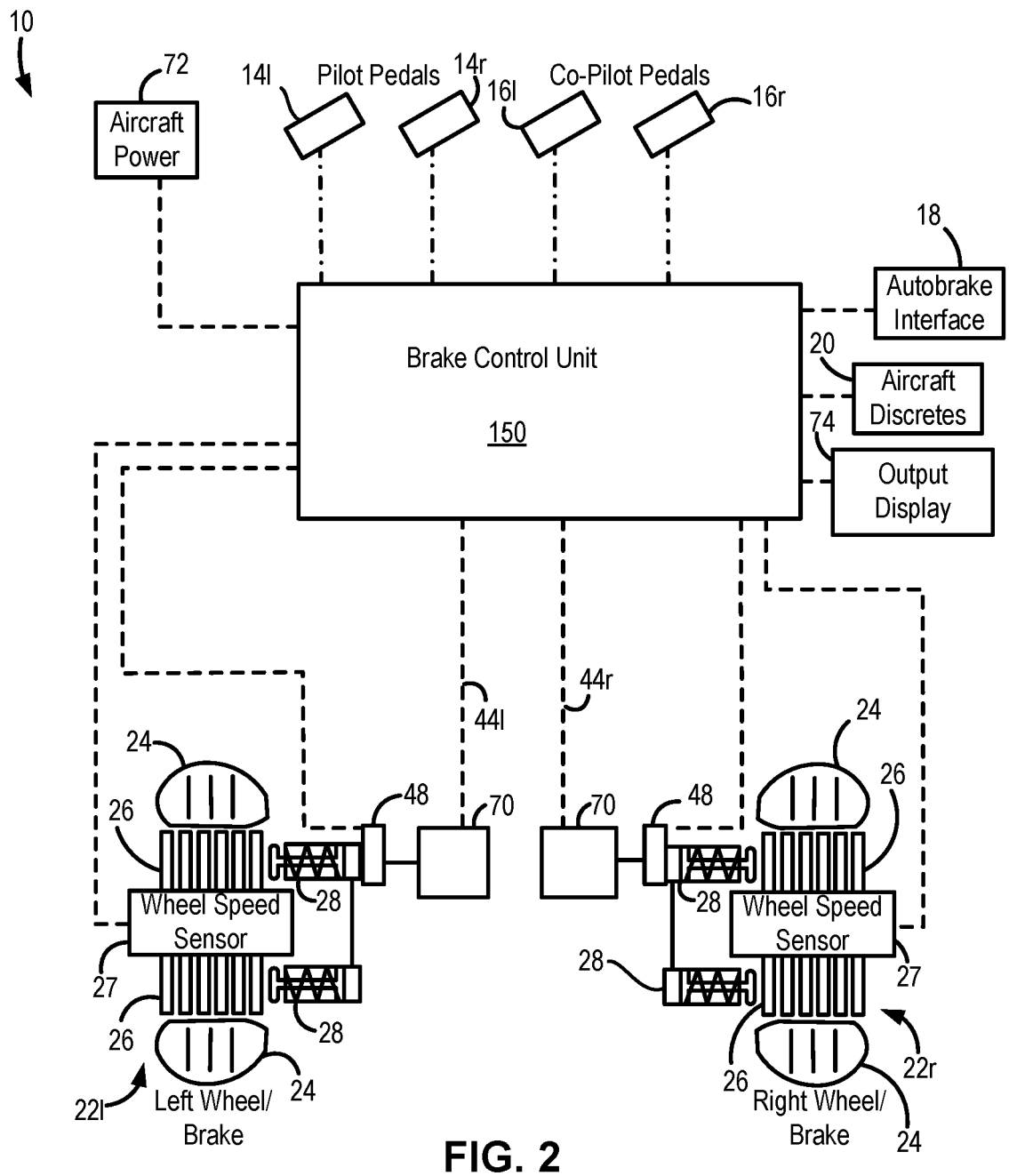
FIG. 2 illustrates a functional diagram of a braking system of the aircraft of FIG. 1, in accordance with various embodiments.

Referring now also to FIG. 2, including with continued reference to FIG. 1, a braking system 10 is shown in accordance with various embodiments. The braking system 10 includes the brake control unit (BCU) 150 of FIG. 1, which is programmed to control the various braking functions described herein. In various embodiments, the braking system 10 enables the aircraft 100 to brake, thereby slowing aircraft 100 when on the ground. However, it will be appreciated that the braking system 10 may also be used in connection with other types of vehicles without departing from the scope of the inventive arrangements.

As described herein, the braking system generally includes, inter alia, the brake control unit 150, a wheel/brake assembly including one or more wheels and brake stacks (e.g., wheel/brake assembly 22l includes one or more wheels 24 and brake stacks 26), and one or more wheel speed sensors 27 that provide wheel speed information to the BCU 150 for carrying out brake control operations. In addition, power to the BCU 150 may be provided from an aircraft power source 72, such as a DC power source within the aircraft 100. In various embodiments, power is transmitted from the aircraft power source 72 to the BCU 150.

In various embodiments, the braking system 10 further includes an output device and/or output display 74 coupled to the BCU 150. The output device and/or output display 74 is configured to communicate information to the pilot, co-pilot, and/or maintenance crew relating to the braking operations. For example, in various embodiments, the output device and/or output display 74 includes a display, a speaker, a network access device, and/or the like that sends a message to a remote terminal, or the like. In various embodiments, the BCU 150 controls the output device and/or output display 74 to output the health status of the braking system 10, including the various components thereof. The BCU 150 may also receive a series of discrete control signals associated with the aircraft 100, generally represented as aircraft discretes 20, for providing braking control thereof.

In various embodiments of the braking system, the BCU 150 receives brake command signals from a left pilot brake pedal 14l and a right pilot brake pedal 14r and/or a left co-pilot brake pedal 16l and a right co-pilot brake pedal 16r. The brake command signals from the left pilot brake pedal 14l and the right pilot brake pedal 14r and/or the left co-pilot brake pedal 16l and the right co-pilot brake pedal 16r are indicative of a desired amount of braking. However, any suitable brake pedal configuration is within the scope of the present disclosure. Furthermore, the BCU 150 may receive control signals from an auto-brake interface 18 for performing auto-brake and RTO braking functions.

In various embodiments, the BCU 150 controls braking of the left wheel/brake assembly 22l and the right wheel/brake assembly 22r. The left wheel/brake assembly 22l includes one or more wheels 24 and brake stacks 26. A plurality of actuators 28 may be provided for exerting braking forces on the brake stacks 26 in order to brake the wheels 24. The right wheel/brake assembly 22r has a similar, mirrored configuration. Both the left wheel/brake assembly 22l and the right wheel/brake assembly 22r also include, in various embodiments, wheel speed sensors 27 that provide wheel speed information to the BCU 150 for carrying out brake control operations.

In various embodiments, BCU 150 sends brake command signals (also referred to herein as antiskid brake command signals) to a brake control component to apply a braking force to the wheels 24 during a braking operation. In the illustrated embodiment, BCU 150 sends i) a left brake command signal 44l to a brake control component 70 to apply a braking force to a brake stack 26 via actuators 28 of a left wheel/brake assembly 22l; and ii) a right brake command signal 44r to a brake control component 70 to apply a braking force to a brake stack 26 via actuators 28 of a right wheel/brake assembly 22r. In various embodiments, the braking system 10 includes pressure sensors 48 for monitoring the pressure applied by actuators 28 and to provide such information back to the BCU 150.

In various embodiments, the braking system 10 is a hydraulic braking system, wherein the brake control component 70 comprises one or more valves for controlling hydraulic pressure to actuators 28. For example, brake control component 70 may comprise one or more shutoff valves and/or one or more servo valves, such as a coil valve for example. In various embodiments, the braking system 10 is an electric braking system, wherein the brake control component 70 comprises an electromechanical actuator controller (EMAC). An EMAC may receive and interpret a brake force command and receives electrical power to then provide power to drive electromechanical actuators 28. However, the brake control component 70 may comprise any type of brake component (i.e., hydraulic, electromechanical, etc.) without departing from the scope of the present disclosure and is not intended to be limited by the illustrated embodiment.

In various embodiments, the braking system 10 may be activated by the left pilot brake pedal 14l, the right pilot brake pedal 14r, the left co-pilot brake pedal 16l, and the right co-pilot brake pedal 16r respectively acting through the left brake command signal 44l, and the right brake command signal 44r. The braking system 10 may also be activated in an autobraking mode.

Figure 3:
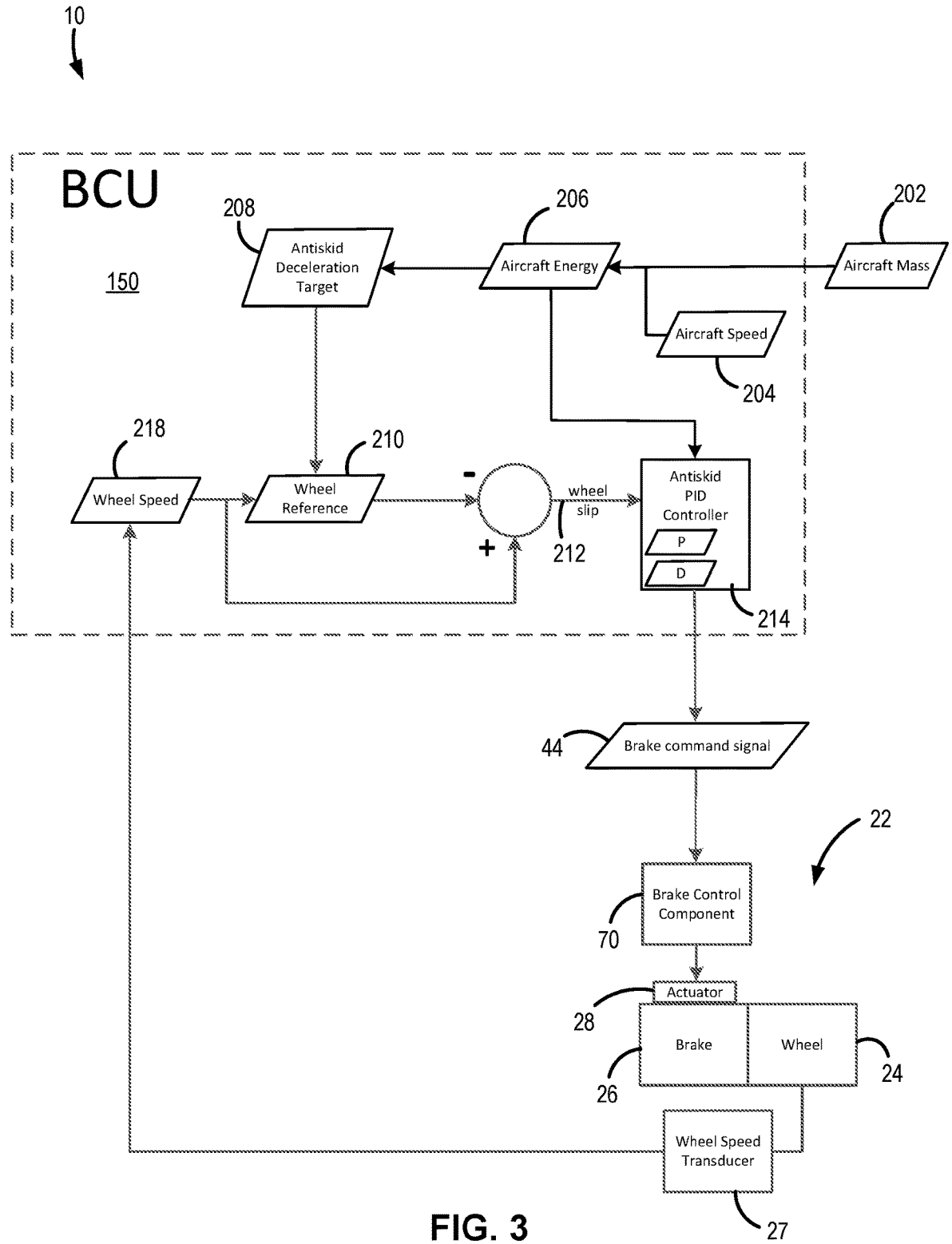
FIG. 3 illustrates a schematic diagram of an antiskid brake control logic for the brake control unit, in accordance with various embodiments.

With reference to FIG. 3, a schematic view of a portion of the braking system 10 with additional detail of a brake control logic of BCU 150 is illustrated, in accordance with various embodiments. The illustrated embodiments depicts BCU 150 in electronic communication with brake control component 70 of wheel/brake assembly 22 comprising the brake control component 70, brake stack 26, and wheel 24. The BCU 150 may be configured to output brake command signal 44 (e.g., a current signal or a voltage signal) to the brake control component 70 for controlling the braking force applied to brake stack 26 via actuator 28. A wheel speed sensor 27 is provided for detecting wheel speed data, including wheel speed 218 of wheel 24 which is received by BCU 150. The wheel speed 218 (e.g., in units of revolutions per second) is used by BCU 150 for calculating an antiskid brake command signal 44 adjusted for aircraft kinetic energy, as provided herein.

In various embodiments, the BCU 150 may utilize the wheel speed 218 to estimate an aircraft speed 204. BCU 150 may utilize a plurality of wheel speeds 218, for example an average based upon each monitored wheel of the aircraft, to estimate aircraft speed 204. In various embodiments, aircraft speed 204 may be received from avionics unit 140 (see FIG. 1). The aircraft speed 204 may correspond to an estimated linear velocity (e.g., in units of meters per second (m/s)) of the aircraft. The BCU 150 may further receive aircraft mass data 202 comprising the present (i.e., real-time) total mass (e.g., in units of kilograms (kg)) of the aircraft. The BCU 150 may receive the aircraft mass data 202 from an external control unit, such as avionics unit 140 (see FIG. 1). The BCU 150 may use the aircraft mass data 202 and the aircraft speed 204 to calculate an aircraft kinetic energy 206 which corresponds to a total kinetic energy of the aircraft. In various embodiments, the BCU 150 calculates the aircraft kinetic energy 206 using the equation $$KE = \frac{1}{2} mV^2,$$

where KE is the aircraft kinetic energy 206, m is the aircraft mass data 202, and V is the aircraft speed 204.

Wheel reference speed 210 may comprise a value corresponding to the rotational speed of wheel 24 as if wheel 24 were free rolling (i.e., no braking being applied). In this regard, the difference between WRS 210 and wheel speed 218 may be proportional to the difference between the linear speed of the aircraft (i.e., aircraft speed 204) and a speed of the wheel 24 of the aircraft, also referred to as wheel slip 212. Wheel slip 212 may be sent to antiskid proportional-integral-derivative (PID) controller 214 for generating antiskid brake command signal 44. BCU 150 may use wheel speed 218 to calculate wheel reference speed 210. During braking, wheel reference speed 210 may be adjusted to be equal to the wheel speed 218 in response to wheel 24 decelerating at a rate that is not greater than antiskid deceleration target 208, in which case wheel slip 212 is zero. In response to wheel 24 decelerating at a rate greater than antiskid deceleration target 208, the wheel slip 212 is monitored and antiskid PID controller 214 may adjust brake command signal 44 to maintain a deceleration of wheel speed 218 to be not greater than the antiskid deceleration target 208. In response to the wheel speed 218 changing at a rate which is greater than antiskid deceleration target 208, the wheel slip 212 comprises a negative value and the antiskid PID controller 214 acts in response to this error by adjusting brake command signal 44 to allow the wheel speed 218 to recover to an acceptable deceleration. In this regard, antiskid deceleration target 208 may be a maximum allowable deceleration of a wheel.

Figure 5:
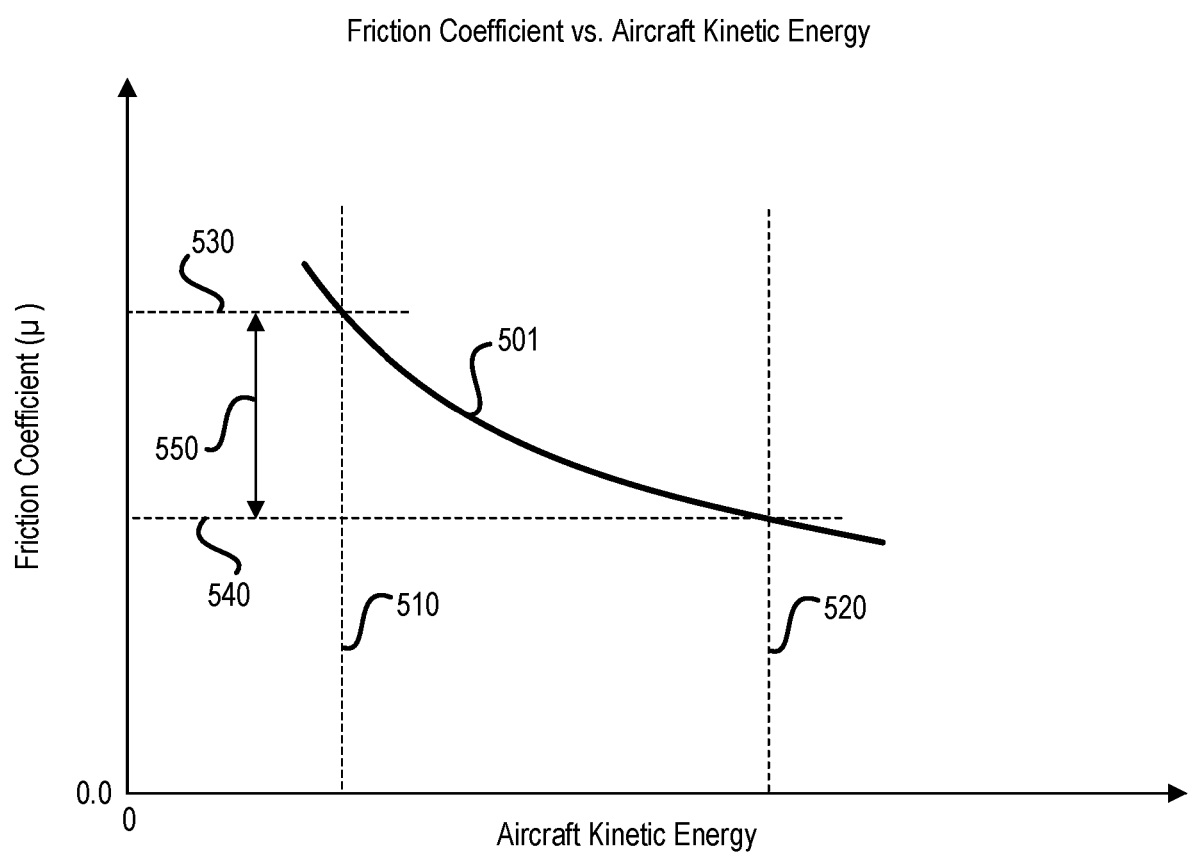
FIG. 5 illustrates a plot of a coefficient of friction curve, in accordance with various embodiments.

With additional reference to FIG. 5, a plot is provided illustrating a coefficient of friction curve 501 of a coefficient of friction for a brake stack (e.g., brake stack 26) versus aircraft kinetic energy (e.g., aircraft kinetic energy 206). The coefficient curve 501 shows that the coefficient of friction of the brake stack decreases as the landing/RTO aircraft kinetic energy increases. In this regard, an aircraft braking system may be more responsive for aircraft having lower energies (i.e., due to reduced speed, mass, or both) than for aircraft having higher energies (i.e., due to increased speed, mass, or both). Stated differently, an aircraft braking system may tend to become less responsive as aircraft landing energy increases. In this regard, it may be desirable to adjust a brake command based upon the landing/RTO aircraft kinetic energy in order to tune brake control for a wide range of aircraft landing energies.

In various embodiments, BCU 150 may be programmed to perform brake control using default antiskid parameters (i.e., antiskid deceleration target 208, proportional gain (P), and derivative gain (D)). Based upon the measured aircraft kinetic energy, these default antiskid parameters may be scaled proportionate to the difference between the coefficient of friction value associated with the default antiskid parameters and the coefficient of friction value associated with the landing/RTO aircraft kinetic energy that is measured when the braking operation is initiated.

In various embodiments, BCU 150 comprises an antiskid PID controller 214. The antiskid PID controller 214 may apply a correction to the brake command signal based on proportional, integral, and derivative terms, denoted P, I, and D, respectively. In accordance with the present disclosure, the proportional gain (P) and/or the derivative gain (D) may be scaled or adjusted based upon the landing/RTO aircraft kinetic energy 206. In various embodiments, the proportional gain (P) and/or the derivative gain (D) may be scaled or adjusted based upon the landing/RTO aircraft kinetic energy 206, in accordance with coefficient curve 501 of FIG. 5. For example, with combined reference to FIG. 3 and FIG. 5, BCU 150 may operate using default antiskid parameters associated with a coefficient of friction 530 (also referred to herein as a first coefficient of friction) which corresponds to a landing/RTO kinetic energy 510 (also referred to herein as a default kinetic energy or a first kinetic energy). It should be noted that the BCU may default to any coefficient of friction, be it relatively high or relatively low with respect to coefficient curve 501. The BCU 150 may determine that an aircraft comprises a landing/RTO kinetic energy 520 (also referred to herein as a second kinetic energy) during a braking maneuver (such as during landing or RTO) which corresponds to a coefficient of friction 540 (also referred to herein as a second coefficient of friction). In response to detecting the landing/RTO kinetic energy 520, BCU 150 may adjust the proportional gain (P) and/or the derivative gain (D) to scale the brake command signal 44 proportional to the percent difference 550 between the coefficient of friction 530 and the coefficient of friction 540, which in this example would proportionally increase a commanded braking force due to the estimated reduced coefficient of friction of the brake stack with respect to the coefficient of friction 530.

In various embodiments, BCU may further comprise an antiskid deceleration target 208. The antiskid deceleration target 208 may be programmed into the BCU 150. For example, the antiskid deceleration target 208 may comprise a value such as negative six meters per second squared (−6 m/s²), negative four and a half meters per second squared (−4.5 m/s²), negative three meters per second squared (−3 m/s²), or any other suitable deceleration target value for an aircraft. The present disclosure is not intended to be limited by the particular value of the antiskid deceleration target 208. In addition to, or as an alternative to, adjusting the proportional gain (P) and/or the derivative gain (D) of the antiskid PID controller 214, BCU may adjust the antiskid deceleration target 208 to compensate for a detected aircraft kinetic energy 206. Continuing with the above example, BCU 150 may adjust the antiskid deceleration target 208 to scale the brake command signal 44 proportional to the percent difference 550 between the coefficient of friction 530 and the coefficient of friction 540, which in this example the BCU may increase the absolute value of the antiskid deceleration target 208 to proportionally increase a commanded braking force due to the reduction in the estimated coefficient of friction of the brake stack with respect to the coefficient of friction 530.

Figure 4:
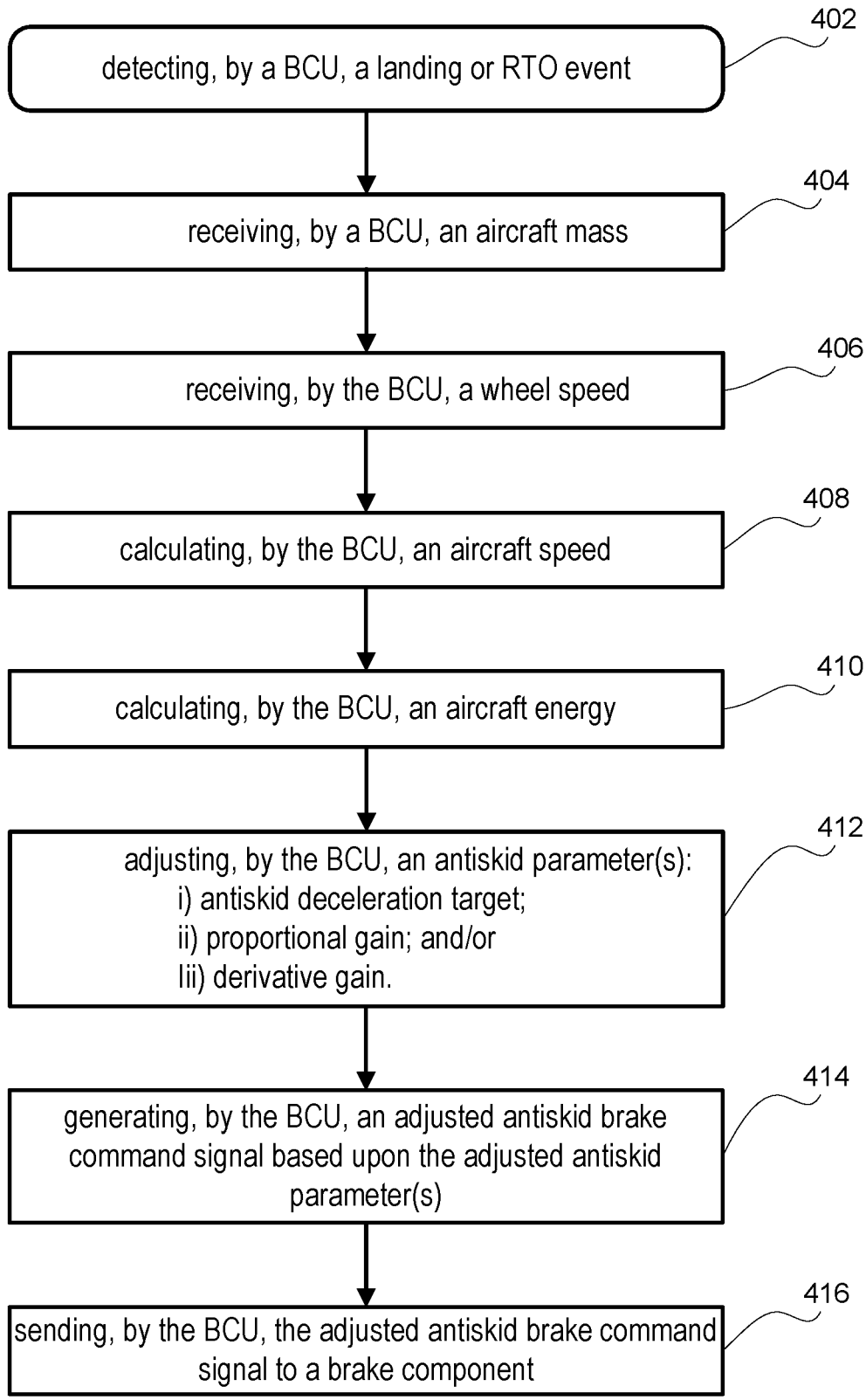
FIG. 4 illustrates a flowchart of a method of antiskid brake control, in accordance with various embodiments.

With reference to FIG. 4, a method 400 for antiskid brake control is provided, in accordance with various embodiments. Method 400 may be initiated in response to the BCU detecting a landing or RTO event (step 402). Method 400 includes receiving, by a BCU, an aircraft weight (step 404). Method 400 includes receiving, by the BCU, a wheel speed (step 406). Method 400 includes calculating, by the BCU, an aircraft speed (step 408). Method 400 includes calculating an aircraft energy (step 410). Method 400 includes adjusting, by the BCU, an antiskid parameter(s) (step 412). Method 400 includes generating, by the BCU, an adjusted antiskid brake command signal based upon the adjusted antiskid parameter(s) (step 414). Method 400 includes sending, by the BCU, the adjusted antiskid brake command signal to a brake system component (step 416).

With combined reference to FIG. 3 and FIG. 4, step 402 may comprise detecting, by BCU 150, a landing event or an RTO event. Step 402 may comprise detecting, by BCU 150, a weight-on-wheels condition of the aircraft. Step 402 may comprise detecting, by BCU 150, an RTO based upon a brake signal received from a cockpit of the aircraft. Step 404 may comprise receiving, by BCU 150, aircraft mass data 202 from avionics unit 140 (see FIG. 1). Step 406 may comprise receiving, by BCU 150, wheel speed 218. Step 408 may comprise calculating, by BCU 150, aircraft speed 204. Step 410 may comprise calculating, by BCU 150, aircraft kinetic energy 206. Step 412 may comprise adjusting, by BCU 150, an antiskid parameter(s), such as proportional gain (P), derivative gain (D), and/or antiskid deceleration target 208, as described herein. Step 414 may comprise generating, by BCU 150, brake command signal 44 based upon the adjusted antiskid parameter(s). Step 416 may comprise sending, by BCU 150, the adjusted antiskid brake command signal (i.e., brake command signal 44) to brake control component 70 to apply a stopping force to wheel 24 (e.g., via actuator 28).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A method for antiskid brake control, comprising:
receiving, by a brake control unit, an aircraft mass;
receiving, by the brake control unit, a wheel speed signal;
determining, by the brake control unit, an aircraft speed based upon the wheel speed signal;

calculating, by the brake control unit, an aircraft first kinetic energy during landing, prior to braking, using the aircraft mass and the aircraft speed;

determining, by the brake control unit, a brake stack first coefficient of friction corresponding to the aircraft first kinetic energy;

responsive to determining the brake stack first coefficient of friction, adjusting, by the brake control unit, an antiskid parameter based upon the brake stack first coefficient of friction;

generating, by the brake control unit, a first antiskid brake command signal based upon the adjusted antiskid parameter;

sending, by the brake control unit, the first antiskid brake command signal to a brake control component to apply a first stopping force to a wheel assembly;

receiving, by the brake control unit, an updated wheel speed signal;

determining, by the brake control unit, an updated aircraft speed based upon the updated wheel speed signal;

calculating, by the brake control unit, an aircraft second kinetic energy during braking using the aircraft mass and the updated aircraft speed;

determining, by the brake control unit, a brake stack second coefficient of friction corresponding to the aircraft second kinetic energy;

responsive to determining the brake stack second coefficient of friction, adjusting, by the brake control unit, the antiskid parameter based upon the brake stack second coefficient of friction;

generating, by the brake control unit, a second antiskid brake command signal based upon the adjusted antiskid parameter; and sending, by the brake control unit, the second antiskid brake command signal to the brake control component to apply a second stopping force to the wheel assembly.

2. The method of claim 1, wherein the antiskid parameter is a deceleration target value.

3. The method of claim 2, wherein the deceleration target value comprises a maximum desired deceleration of a wheel.

4. The method of claim 1, wherein the brake control unit generates the antiskid brake command signal using a PID controller.

5. The method of claim 4, wherein the antiskid parameter is a proportional gain value.

6. The method of claim 4, wherein the antiskid parameter is a derivative gain value.

7. The method of claim 1, wherein the aircraft first kinetic energy is calculated using an equation $$KE = \frac{1}{2} mV^2,$$

where KE is the aircraft first kinetic energy, m is the aircraft mass, and V is the aircraft speed.

8. The method of claim 1, wherein the aircraft mass is received by the brake control unit from an aircraft avionics unit and the wheel speed signal is received by the brake control unit from a wheel speed sensor associated with the wheel assembly.

9. The method for antiskid brake control of claim 1, further comprising: determining, by the brake control unit, a difference between a baseline brake stack coefficient of friction and the brake stack first coefficient of friction corresponding to the aircraft first kinetic energy.

10. The method for antiskid brake control of claim 1, wherein adjusting, by the brake control unit, the antiskid parameter based upon the brake stack first coefficient of friction results in increasing a commanded braking force in response to the baseline brake stack coefficient of friction being greater than the brake stack first coefficient of friction, and wherein adjusting, by the brake control unit, the antiskid parameter based upon the brake stack first coefficient of friction results in decreasing a commanded braking force in response to the baseline brake stack coefficient of friction being less than the brake stack first coefficient of friction.

11. The method for antiskid brake control of claim 1, wherein the brake stack first coefficient of friction represents a first friction condition internal to aircraft components and wherein the brake stack second coefficient of friction represents a second friction condition internal to aircraft components.

12. An antiskid brake control system, comprising:
a brake control unit (BCU) having a processor; and
a tangible, non-transitory memory configured to communicate with the processor, the tangible, non-transitory memory having instructions stored thereon that, in response to execution by the processor, cause the BCU to perform operations comprising:
receiving, by the BCU, an aircraft mass;
receiving, by the BCU, a wheel speed signal;
determining, by the BCU, an aircraft speed based upon the wheel speed signal;
calculating, by the BCU, an aircraft first kinetic energy during landing, prior to braking, using the aircraft mass and the aircraft speed;
determining, by the BCU, a brake stack first coefficient of friction corresponding to the aircraft first kinetic energy;
responsive to determining the brake stack first coefficient of friction, adjusting, by the BCU, an antiskid parameter based upon the brake stack first coefficient of friction;
generating, by the BCU, an antiskid brake command signal based upon the adjusted antiskid parameter;
sending, by the BCU, the antiskid brake command signal to a brake control component for applying a stopping force to a wheel assembly;
receiving, by the BCU, an updated wheel speed signal;
determining, by the BCU, an updated aircraft speed based upon the updated wheel speed signal;
calculating, by the BCU, an aircraft second kinetic energy during braking using the aircraft mass and the updated aircraft speed;
determining, by the BCU, a brake stack second coefficient of friction corresponding to the aircraft second kinetic energy;
responsive to determining the brake stack second coefficient of friction, adjusting, by the BCU, the antiskid parameter based upon the brake stack second coefficient of friction;
generating, by the BCU, a second antiskid brake command signal based upon the adjusted antiskid parameter; and
sending, by the BCU, the second antiskid brake command signal to the brake control component to apply a second stopping force to the wheel assembly.

13. The antiskid brake control system of claim 12, wherein the aircraft mass is received by the BCU from an aircraft avionics unit.

14. The antiskid brake control system of claim 12, wherein the wheel speed signal is received by the BCU from a wheel speed sensor associated with the wheel assembly.

15. The antiskid brake control system of claim 12, wherein the antiskid parameter is a deceleration target value.

16. The antiskid brake control system of claim 12, wherein the BCU generates the antiskid brake command signal using a PID controller.

17. The antiskid brake control system of claim 16, wherein the antiskid parameter is a proportional gain value.

18. The antiskid brake control system of claim 16, wherein the antiskid parameter is a derivative gain value.

19. An antiskid brake control system, comprising:
   a brake control unit (BCU);
   a wheel/brake assembly comprising a wheel, a brake stack, and an actuator configured to apply a braking force onto the brake stack; and
   a wheel speed sensor in electronic communication with the BCU, the wheel speed sensor configured to detect a wheel speed corresponding to the wheel;
   wherein the BCU is configured to:
      receive an aircraft mass from an aircraft avionics unit;
      calculate an aircraft speed based upon the wheel speed;
      calculate an aircraft first kinetic energy during landing, prior to braking, using the aircraft mass and the aircraft speed;
      determine a brake stack first coefficient of friction corresponding to the aircraft first kinetic energy;
      responsive to determining the brake stack first coefficient of friction, generate an antiskid brake command signal based upon the brake stack first coefficient of friction;
      send the antiskid brake command signal to a brake control component for controlling the braking force;
      receive an updated wheel speed signal;
      determine an updated aircraft speed based upon the updated wheel speed signal;
      calculate an aircraft second kinetic energy during braking using the aircraft mass and the updated aircraft speed;
      determine a brake stack second coefficient of friction corresponding to the aircraft second kinetic energy;
      responsive to determining the brake stack second coefficient of friction, adjust the antiskid parameter based upon the brake stack second coefficient of friction;
      generate a second antiskid brake command signal based upon the adjusted antiskid parameter; and
      send the second antiskid brake command signal to the brake control component to apply a second stopping force to the wheel assembly.

20. The antiskid brake control system of claim 19, wherein the BCU is further configured to adjust an antiskid parameter based upon the aircraft kinetic energy, the antiskid parameter comprises at least one of a proportional gain value, a derivative gain value, and a deceleration target value, and the antiskid brake command signal is generated using the adjusted antiskid parameter.

* * * * *